UNITED STATES PATENT OFFICE.

OSCAR BALLY, OF MANNHEIM, GERMANY, ASSIGNOR TO BADISCHE ANILIN & SODA FABRIK, OF LUDWIGSHAFEN-ON-THE-RHINE, GERMANY, A CORPORATION.

VAT DYES AND PROCESS OF MAKING THEM.

1,202,260.  Specification of Letters Patent.  Patented Oct. 24, 1916.

No Drawing.  Application filed October 21, 1914.  Serial No. 867,717.

*To all whom it may concern:*

Be it known that I, OSCAR BALLY, Ph. D., chemist, citizen of the Swiss Republic, residing at Mannheim, Germany, have invented new and useful Improvements in Vat Dyes and Processes of Making Them, of which the following is a specification.

In the specification of Patent No. 1,128,836, Serial No. 784,811, I have described a new class of coloring matters which are amino derivatives of dibenzanthrones containing an organic radical in the amino group, and the specification of application for patent Serial No. 804,714 states that the same or similar coloring matters can be obtained by introducing an aldehyde radical into a leuco compound of an amino-dibenzanthrone. In neither of the said applications is a coloring matter containing halogen mentioned or described.

I have now discovered that those derivatives of amino-dibenzanthrones which contain both an organic radical in the amino group and also halogen in the molecule are particularly valuable, since they give on cotton shades which are clearer and considerably redder than the corresponding dyes which are free from halogen. In this application I regard the expression dibenzanthrone as including those compounds which are regarded as possessing the dibenzanthrone grouping possessing probably the structural formula:

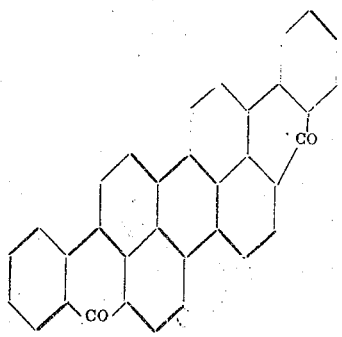

and also those which are regarded as possessing the iso-dibenzanthrone grouping, the structural formula of which is probably:

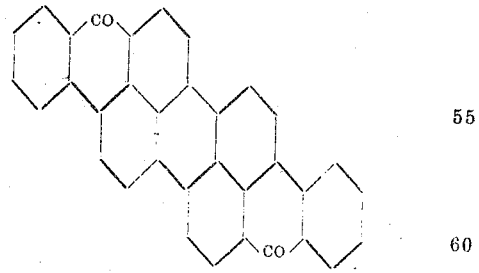

My new compounds may contain halogen either attached to the dibenzanthrone nucleus or to the organic radical, or they may contain halogen in both these positions. The introduction of the halogen can take place either by employing halogenated initial materials, for instance, halogenated amino-dibenzanthrones, or halogenated aldehydes, acid chlorids and the like, or the ready formed coloring matter, obtained as described in either of the aforesaid specifications, can be subsequently halogenated.

My new compounds possess the general characteristics of the dyes claimed in my previous application Serial No. 784,811, that is to say, they consist when dry of dark powders and yield from blue to blue-violet solutions in concentrated sulfuric acid. They dye cotton from a hydrosulfite vat from red to Bordeaux shades and are distinguished from the dyes specifically mentioned in my said previous application in that they contain halogen.

The following examples will serve to illustrate further the nature of this invention, which, however, is not confined to these examples. The parts are by weight.

Example 1: Boil together one part of amino-dibenzanthrone and ten parts of ortho-chlor-benzaldehyde, whereupon the green color of the melt rapidly turns red. When the shade no longer alters, the reaction is finished and on allowing the mass to cool, the coloring matter crystallizes out. Filter this off and free it from excess of ortho-chlor-benzaldehyde. It yields a pure blue vat in alkaline hydrosulfite solution and dyes cotton full Bordeaux shades.

Example 2: Suspend one part of the condensation product obtainable according to the foregoing Example 1 in twenty parts of nitrobenzene, all three parts of sulfuryl chlorid and one-tenth of a part of iodin and heat on the water bath until the evolution of hydrochloric acid ceases. Then boil for a short time, allow the mass to cool and filter off the coloring matter and wash it with alcohol and then dry it. It dyes cotton from the hydrosulfite vat brilliant red shades of excellent fastness.

Instead of sulfuryl chlorid, other halogenating agents can be employed, either with, or without, the addition of halogen carriers, and, if desired, the nitrobenzene can be replaced by other solvent, or diluent.

Now what I claim is:—

1. The new vat dyes which are amino derivatives of a dibenzanthrone containing an organic radical attached to the amino group and also contain halogen, which new dyes consist when dry of dark powders, yield from blue to blue-violet solutions in concentrated sulfuric acid and dye cotton from a hydrosulfite vat from red to Bordeaux shades.

2. The new vat dye which is an amino-dibenzanthrone substituted in the amino group by an ortho-chlor-benzaldehyde residue, which new coloring matter contains chlorin and consists when dry of a dark powder, which yields a violet-blue solution in concentrated sulfuric acid and a pure blue vat in alkaline hydrosulfite solution and dyes cotton full Bordeaux shades.

3. The process of producing vat dyes of the anthraquinone series which consists in reacting on an amino derivative of a dibenzanthrone with a substance capable of introducing a halogenated organic radical into the said amino group.

4. The process of producing a vat dye of the anthraquinone series by reacting on amino-dibenzanthrone with ortho-chlor-benzaldehyde.

In testimony whereof I have hereunto set my hand in the presence of two subscribing witnesses.

OSCAR BALLY.

Witnesses:
 H. MERLE COCHRAN,
 N. ERNST.